United States Patent
Riedhammer

[11] 3,932,993
[45] Jan. 20, 1976

[54] CONTROL APPARATUS FOR AN ADJUSTABLE HYDRAULIC MACHINE DRIVEN BY AN ADJUSTABLE DRIVING MOTOR

[75] Inventor: Josef Riedhammer, Ulm, Germany
[73] Assignee: Hydromatik GmbH, Ulm, Germany
[22] Filed: Dec. 11, 1974
[21] Appl. No.: 531,542

[30] Foreign Application Priority Data
Dec. 19, 1973 Germany............................ 2363335

[52] U.S. Cl. ........................ 60/431; 60/447; 60/449
[51] Int. Cl.² .................... F16D 31/00; F16H 39/46
[58] Field of Search ............. 60/431, 434, 445, 447, 60/449

[56] References Cited
UNITED STATES PATENTS

| | | | |
|---|---|---|---|
| 3,167,907 | 2/1965 | Kempson | 60/449 X |
| 3,214,911 | 11/1965 | Kempson | 60/431 |
| 3,284,999 | 11/1966 | Lease | 60/449 X |

*Primary Examiner*—Edgar W. Geoghegan
*Attorney, Agent, or Firm*—Owen, Wickersham & Erickson

[57] ABSTRACT

Apparatus for adjusting a hydraulic machine driven by an adjustable driving motor comprises an adjustment motor which adjusts the machine in one sense under one fluid control input dependent upon actual driving motor speed and in an opposite sense under an opposing such input supplied at a control outlet of a pressure control valve device in dependence upon the position of a valve slide thereof urged by the first input against a biasing force selectively adjustable in dependence upon desired driving motor speed. When the actual speed falls sufficiently relative to the desired speed, the slide travels from one position, blocking flow from a fluid inlet of the valve device to its control outlet, to another position allowing such flow and also allowing the second input thus produced to act on the slide, in the same direction as the first does, until the slide returns to its initial position.

3 Claims, 2 Drawing Figures

CONTROL APPARATUS FOR AN ADJUSTABLE HYDRAULIC MACHINE DRIVEN BY AN ADJUSTABLE DRIVING MOTOR

BACKGROUND OF THE INVENTION

This invention relates to control apparatus for an adjustable hydraulic machine driven by a driving motor which can be set to different desired speeds.

For a drive assembly comprising an internal combustion engine and a continuously adjustable hydraulic (hydrostatic) transmission system and, optionally, further outputs or power take-offs, control apparatus has been proposed which comprises a fluid-operated adjustment motor having an adjusting piston which, under the action on one side of the piston of a first fluid control input whose pressure is a function of the actual speed of the internal combustion engine speed, is displaceable in one direction so as to effect the adjustment of an adjustable hydraulic pump or motor of the transmission system in one sense, the adjusting piston being displaceable in the opposite direction, under the action on an opposite side of the piston of a second fluid control input produced if the actual speed of the internal combustion engine drops by more than a predetermined amount relative to a desired speed to which the engine is set, so as to effect adjustment of the relevant hydraulic pump or motor in the opposite sense.

Control apparatus such as described in the preceding paragraph has been proposed in German Offenlegungsschrift No. 1,576,317. With this apparatus, the desired speed of the internal combustion engine is determined by a speed controller which, if the actual engine speed falls below the desired speed, channels the pressure of the first fluid control input on to the opposite side of the adjusting piston of the fluid-operated adjustment motor. Accordingly, the adjustment motor rapidly resets a hydraulic pump of the transmission system to zero stroke, i.e. the transmission ratio of the transmission system is reset, so as to avoid the overload of the internal combustion engine, until its actual speed has once again increased to the desired speed. In this way, regulation or control towards a predetermined working point, i.e. floating controller action, is achieved whereby the internal combustion engine is urged to regain its set desired speed with maximum rapidity. However, regulation or control arrangements of this kind tend to exhibit the phenomenon of "hunting".

SUMMARY OF THE INVENTION

The present invention is accordingly concerned with how the speed of a driving motor (e.g. an internal combustion engine) for a hydraulic machine in a hydraulic transmission system may be kept constant as far as possible, and with how adjustment of the machine, and thus of the transmission system, may, in relatively simple manner, be effected proportionally to the deviation of the actual speed of the driving motor from its desired speed.

With these aims in view, according to the present invention there is provided control apparatus for an adjustable hydraulic machine driven by a driving motor which can be set to different desired speeds, comprising:

a fluid-operated adjustment motor having first and second control inlets for first and second fluid control inputs respectively, and having a machine-adjustment control member displaceable in one direction under the action of the said first fluid control input, to effect adjustment of the hydraulic machine in one sense, and displaceable in the opposite direction under the action of the said second fluid control input to effect adjustment of the hydraulic machine in an opposite sense;

and a pressure-control valve device comprising:

a valve housing having first and second fluid inlets, for connection to receive a fluid pressure input which provides the said first fluid control input and varies with the actual speed of the driving motor, a control outlet for connection to the said second control inlet to supply thereto the said second fluid control input, and a discharge outlet; portions of the housing defining a first control chamber, connected to the said first fluid inlet, a second control chamber, connected with the said control outlet, a first internal passage, connected between the said second fluid inlet and the said control outlet, and a second internal passage connected between the said control outlet and the said discharge outlet, a displaceable valve slide accommodated in the said housing for displacement therein between a first position, in which the slide blocks the said first internal passage but leaves the said second internal passage open, and a second position, in which the slide blocks the second internal passage but leaves the first internal passage open, and intermediate positions in which the slide provides partial opening and closing of the first and second internal passages; respective portions of the slide defining first and second piston faces respectively located in the said first and second control chambers and each facing in a direction from the said first position to the said second position, whereby the slide is urged in the direction from its said second position to its said first position by fluid pressure in the said first control chamber and is additionally urged in that direction, when the control slide is in its said second position, by fluid pressure in the said second control chamber, and adjustable biasing means acting upon the said valve slide to apply thereto a force, selectively adjustable in dependence upon the desired speed of the said driving motor, urging the said valve slide from its said first position to its said second position; whereby a fall of the actual speed of the driving motor by more than a predetermined amount relative to a selected desired speed of the driving motor initiates compensatory adjustment of the hydraulic machine by way of the said adjustment motor.

It will be appreciated that such control apparatus may be employed for adjustment of an adjustable hydraulic machine in a drive assembly comprising, in addition to the control apparatus and the adjustable hydraulic machine, a further hydraulic machine, a hydraulic pressure line extending between the hydraulic machines to establish a hydraulic driving connection between these machines, and a driving motor, for example an internal combustion engine, which is settable to different desired speeds and is arranged in mechanical driving connection with a selected one of the hydraulic machines. For supplying the above-mentioned first and second fluid inlets of the pressure control valve device with a fluid pressure input which provides the above-mentioned first fluid control input for the fluid-operated adjustment motor and varies with the actual speed of the driving motor, the drive assembly may include an auxiliary pump having a fluid pressure outlet which is connected with the above-mentioned first control inlet of the adjustment motor and with the first and second fluid inlets of the pressure control valve device, in which case the driving motor is arranged additionally in mechanical driving connection with the auxiliary pump so that the adjustment motor and the pressure control valve device are supplied with the required fluid pressure input from the fluid pressure outlet of the auxiliary pump.

With control apparatus embodying the invention the selectively adjustable force applied by the adjustable biasing means to the valve slide, and thus the pressure of the second fluid control input supplied to the fluid-operated adjustment motor from the control outlet of the pressure control valve device, can either be set to be constant or can be adjusted jointly with a speed-adjusting lever of the driving motor (e.g. a gas pedal in the case of an internal combustion engine). The biasing means may for example comprise a spring acting on the valve slide, in the direction from its above-mentioned first position to its above-mentioned second position, with a selectively adjustable resilient biasing force.

Further, control apparatus embodying the invention makes it possible to effect adjustment of a hydraulic transmission system in proportional dependence upon variation in the speed of an internal combustion engine driving a hydraulic machine of the system, inasmuch as the pressure of the second fluid control input which the fluid-operated adjustment motor is supplied with from the control outlet of the pressure control-valve device builds up proportionally to the speed variation of the internal combustion engine. What takes place is so-called proportional control or proportional action control.

The pressure control valve device employed in control apparatus embodying the invention may be constructed in a manner permitting rapid response of the control apparatus without the occurrence of hunting.

For a better understanding of the invention, and to show how it may be carried into effect, reference will now be made, by way of example, to the accompanying drawings.

Other objects, advantages and features of the invention will become readily apparent from the following detailed description of one embodiment which is presented in conjunction with the accompanying drawings.

DESCRIPTION OF THE PREFERRED EMBODIMENTS

Figure 1:
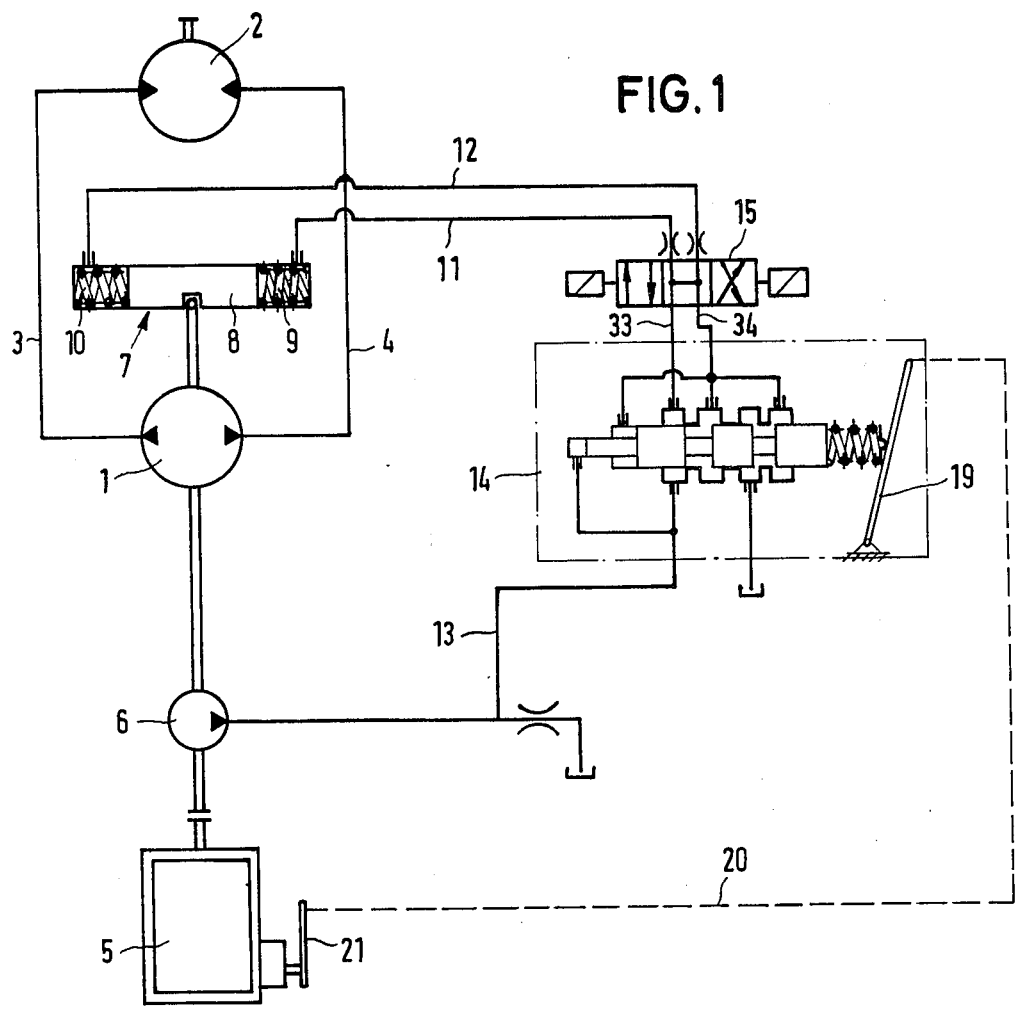
FIG. 1 illustrates, schematically and partly in section, a drive assembly incorporating a hydraulic transmission system and one possible form of control apparatus embodying the present invention.

The hydraulic transmission system of the drive assembly illustrated in FIG. 1 comprises an adjustable hydraulic pump 1 and a hydraulic motor 2 connected together to form a hydraulic circuit by hydraulic pressure lines 3 and 4. The pump 1 is driven by an internal combustion engine 5 simultaneously driving an auxiliary pump 6 for generating a first hydraulic control input for effecting adjustment of the pump 1 by means of a hydraulic adjustment motor 7. The hydraulic adjustment motor 7 comprises an adjusting piston 8 centered in a housing by springs 9 and 10 respectively acting on opposite sides of the piston. The piston 8 is displaceable in one direction under the action of hydraulic pressure in a variable-volume working space bounded by one side of the piston and having a control inlet connected to a hydraulic control line 11, and is displaceable in the opposite direction under the action of hydraulic pressure in a variable-volume working space bounded by the other side of the piston and having a control inlet connected to a hydraulic control line 12. Depending on whether the pump 1 is to be adjusted in one sense of hydraulic delivery or the other, i.e. on whether high pressure is to be produced in the line 3 or the line 4 and, accordingly, on whether the hydraulic motor 3 is to rotate in one direction or the other, the first hydraulic control input for the hydraulic adjustment motor 7 is supplied from the hydraulic pressure outlet of the auxiliary pump 6, by way of a line 13 and a pressure control valve device 14 which will be described below, to one or other of the hydraulic control lines 11 and 12, as determined by the prevailing condition of a direction-of-rotation control valve 15 interposed between the valve device 14 and the lines 11 and 12.

The hydraulic pump 1 may be an adjustable axial machine, in which case the hydraulic adjustment motor 7 may be arranged to cause pivoting of the pump in either sense from a zero-stroke plane. However, the adjustment motor 7 need not be mechanically coupled with the pump 1 to effect adjustment thereof directly. The motor 7 may for example be a servo motor for indirect adjustment of the pump 1, the piston 8 then being a servo piston.

Figure 2:
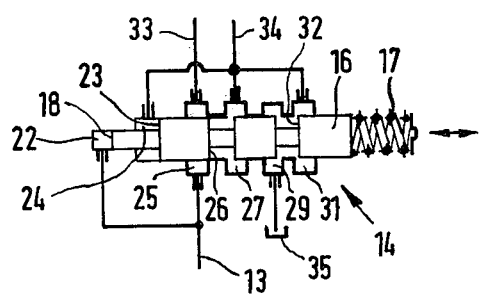
FIG. 2 illustrates, schematically and in section, a pressure control valve device forming part of that control apparatus.

As indicated in FIG. 2, the pressure control valve device 14 comprises a valve slide 16 arranged displaceably in a valve housing. At one end, the valve slide 16 is loaded by adjustable biasing means in the form of an adjustably arranged spring 17, and at its opposite end has a first piston face 18. The spring 17 determines, by the force it exerts on the valve slide 16, the desired speed of the internal combustion engine 5. The spring 17 bears, for this purpose, on an adjustable support member 19 (see FIG. 1) which is coupled by coupling means 20 with, for example, a speed-adjusting lever 21 of the internal combustion engine 5. The piston face 18 of the valve slide 16 is located in a first control chamber 22 defined in the valve housing. A second piston face 23 of the valve slide 16 is located in a second control chamber 24 defined in the valve housing, the piston face 23 facing in the same direction as the piston face 18. The valve housing also defines further control chambers 25, 27, 29 and 31. The control chambers 22 and 25 are respectively provided with first and second hydraulic inlets each connected to the line 13, the control chamber 25 also having a hydraulic outlet connected to a line 33 leading to the control valve 15. The control chamber 27 is provided with a control outlet which is connected to a line 34 also leading to the control valve 15. The control chambers 24 and 31 are respectively provided with inlets which are connected to the control outlet of the chamber 27, while the control chamber 29 is provided with a discharge outlet connected with a drain or tank 35. With the valve slide 16 in a first position, i.e. the illustrated position, a first control portion of the slide providing a control edge 26 blocks a first internal passage between the control chambers 25 and 27, i.e. between the hydraulic inlet of the chamber 25 and the control outlet of the chamber 27, while a second control portion of the slide providing a control edge 32 leaves open a second internal passage between the control chambers 31 and 29, i.e. between the control outlet of the chamber 27 and the discharge outlet of the chamber 29. When displaced, to the left as seen in the Figures, to a second position, however, the above-mentioned first control portion of the slide leaves the above-mentioned first internal passage open while the above-mentioned second control portion of the slide blocks the above-mentioned second internal passage. In one condition of the control valve 15 the outlets of the control chambers 25 and 27 are respectively connected by the lines 33 and 34 to the lines 11 and 12, while in another condition of the valve 15 the connections between the lines 33 and 34 and the lines 11 and 12 are reversed.

The mode of operation of the illustrated drive assembly is as follows:

Via the line 13, the auxiliary pump 6 supplies a hydraulic control input to the control chambers 22 and 25 whose pressure is dependent upon the actual speed of the internal combustion engine 5. The pressure of the hydraulic control input supplied to the control chamber 22 acts on the piston face 18 of the valve slide 16 to urge the slide against the spring 17, i.e. out of its illustrated, first position. The desired maximum value of the pressure of the hydraulic control input supplied to the control chambers 22 and 25 is, corresponding to the desired speed of the internal combustion engine 5, either adjusted to be constant via the spring 17, or is adjusted in dependence upon the speed-adjusting lever 21 of the internal combustion engine. For as long as the hydraulic pressure in the line 13 and the force of the spring 17 are in equilibrium, the valve slide 16 remains in its illustrated, first position. By way of the control chamber 25 and the line 33 the hydraulic control input from the auxiliary pump 6 is supplied to the control valve 15 and, through the latter, via one of the lines 11 and 12 to one of the working spaces bounded by the adjusting piston 8, depending on the particular condition in which the control valve 15 happens to be placed. The other working space of the adjustment motor 7 is, via the other of the lines 12 and 11, the control valve 15, the line 34, the control chamber 31 and the control chamber 29, connected with the drain or pressureless tank 35. The hydraulic control input supplied to the hydraulic adjustment motor 7 from the auxiliary pump 6 by way of the line 33 acts on the adjusting piston 8, in opposition to one or other of the springs 9 and 10, so as to adjust the piston 8 to an extent dependent upon the pressure of this control input and thus on the drive speed of the internal combustion engine 5. With increasing such pressure, i.e. with increasing speed of the internal combustion engine 5, the pump 1 is adjusted by the hydraulic adjustment motor 7 in the sense of increased hydraulic delivery and, therewith, in the sense of higher speed of the hydraulic transmission system.

If the pressure of this hydraulic control input to the adjustment motor 7 falls, on account of a speed reduction of the internal combustion engine 5 resulting from excessively high torque take-off at the hydraulic transmission system, then the force exerted by the spring 17 on the valve slide 16 predominates over the pressure acting in the control chamber 22 on the piston face 18. Accordingly, the valve slide 16 is pushed, towards the left as seen in the drawing, into its above-mentioned second position in which the control edge 32 blocks the line 34 from the drain tank 35, i.e. the control chamber 31 is closed, and the control edge 26 allows hydraulic fluid from the control chamber 25 to pass into the control chamber 27 and thus into the line 34 to provide a further hydraulic control input for the hydraulic adjustment motor 7. Simultaneously, the hydraulic pressure building up in the line 34 acts in the control chamber 24 on the piston face 23 so as to urge the valve slide 16 back towards its first position, i.e. towards the right in the drawing, in opposition to the spring 17.

Thus, the pressure of the further hydraulic control input supplied by way of the line 34 builds up to a value sufficiently high to produce the result that, in concert with the hydraulic pressure acting on the piston face 18 in the control chamber 22, it displaces the valve slide 16 against the action of the spring 17, approximately at least, into the starting position shown. Simultaneously, the further hydraulic control input supplied via the line 34 passes, depending on the prevailing condition of the control valve 15, via the one of the lines 11 and 12 not connected with the line 33, to that working space of the hydraulic adjustment motor 7 which is not connected with the line 33. This further hydraulic control input acts on the adjusting piston 8 so as to bring about adjustment of the pump 1 in the sense of reduced pump delivery - corresponding to reduced torque take-up of the pump. The torque take-up of the pump is, thus, reduced in proportion to the speed reduction of the internal combustion engine 5.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Control apparatus for an adjustable hydraulic machine driven by a driving motor which can be set to different desired speeds, comprising:

a fluid-operated adjustment motor having first and second control inlets for first and second fluid control inputs respectively, and having a machine adjustment control member displaceable in one direction under the action of the said first fluid control input, to effect adjustment of the hydraulic machine in one sense, and displaceable in the opposite direction under the action of the said second fluid control input to effect adjustment of the hydraulic machine in an opposite sense;

and a pressure control valve device comprising:

a valve housing having first and second fluid inlets, for connection to receive a fluid pressure input which provides the said first fluid control input and varies with the actual speed of the driving motor, a control outlet for connection to the said second control inlet to supply thereto the said second fluid control input, and a discharge outlet; portions of the housing defining a first control chamber, connected to the said first fluid inlet, a second control chamber, connected with the said control outlet, first internal passage, connected between the said second fluid inlet and the said control outlet, and a second internal passage connected between the said control outlet and the said discharge outlet, a displaceable valve slide accommodated in the said housing for displacement therein between a first position, in which the slide blocks the said first internal passage but leaves the second internal passage open, a second position, in which the slide blocks the second internal passage but leaves the first internal passage open, and intermediate positions in which the slide provides partial opening and closing of the first and second internal passages; respective portions of the slide defining first and second piston faces respectively located in the said first and second control chambers and each facing in a direction from the said first position to the said second position, whereby the slide is urged in the direction from its said second position to its said first position by fluid pressure in the said control chamber and is additionally urged in that direction, when the control slide is in its said second position, by fluid pressure in the said second control chamber, and adjustable biasing means acting upon the said valve slide to apply thereto a force, selectively adjustable in dependence upon the desired speed of the said driving motor, urging the said valve slide from its said first position to its said second position; whereby a fall of the actual speed of the driving motor by more than a predetermined amount relative to a selected desired speed of the driving motor initiates compensatory adjustment of hydraulic machine by way of the said adjustment motor.

2. A drive assembly comprising:

a continuously adjustable hydraulic transmission system comprising a first hydraulic machine which is adjustable, a second hydraulic machine, and a hydraulic pressure line extending between the first and second hydraulic machines to establish a hydraulic driving connection therebetween;

an auxiliary pump having a fluid pressure outlet;

a driving motor, settable to different desired driving speeds, arranged in mechanical driving connection with a selected one of the said first and second hydraulic machines and in mechanical driving connection with the said auxiliary pump, whereby there is provided at the said fluid pressure outlet a fluid pressure output which varies with the actual driving speed of the driving motor;

a fluid-operated adjustment motor having first and second control inlets for first and second fluid control inputs respectively, and having a machine adjustment control member displaceable in one direction under the action of the said first fluid control input, to effect adjustment of the said first hydraulic machine in one sense, and displaceable in the opposite direction under the action of the said second fluid control input, to effect adjustment of the said first hydraulic machine in an opposite sense;

and a pressure control valve device comprising, a valve housing having first and second fluid inlets connected with the said fluid pressure outlet to receive a fluid pressure input which provides the said first fluid control input and varies with the actual speed of the driving motor, a control outlet for connection to the said second control inlet to supply thereto the said second control input, and a discharge outlet; portions of the housing defining a first control chamber, connected to the said first fluid inlet, a second control chamber, connected with the said control outlet, a first internal passage, connected between the said second fluid inlet and the said control outlet, and a second internal passage connected between the said control outlet and the said discharge outlet;

a displaceable valve slide accommodated in the said housing for displacement therein between a first position, in which the slide blocks the said first internal passage but leaves the said second internal passage open, and a second position, in which the slide blocks the second internal passage but leaves the first internal passage open; respective portions of the slide defining first and second piston faces respectively located in the said first and second control chambers and each facing in a direction from the said first position to the said second position, whereby the slide is urged in the direction from its said second position to its said first position by fluid pressure in the first control chamber and is additionally urged in that direction, when the valve slide is in its said second position, by fluid pressure in the second control chamber, and adjustable biasing means acting upon the said valve slide to apply thereto a force, selectively adjustable in dependence upon the desired speed of the said driving motor, urging the said valve slide from its said first position to its said second position; whereby a fall of the actual speed of the driving motor by more than a predetermined amount relative to a selected desired speed of the driving motor initiates compensatory adjustment of the said fluid operated adjustment motor.

3. A drive assembly as claimed in claim 2, wherein the said driving motor is an internal combustion engine.

* * * * *

UNITED STATES PATENT AND TRADEMARK OFFICE
CERTIFICATE OF CORRECTION

PATENT NO. : 3,932,993
DATED : January 20, 1976
INVENTOR(S) : JOSEF RIEDHAMMER

It is certified that error appears in the above–identified patent and that said Letters Patent are hereby corrected as shown below:

Column 7, line 19, after "in the said" insert --first--.

Signed and Sealed this fourth Day of May 1976

[SEAL]

Attest:

RUTH C. MASON
*Attesting Officer*

C. MARSHALL DANN
*Commissioner of Patents and Trademarks*